United States Patent
Schulz et al.

(10) Patent No.: US 7,421,301 B2
(45) Date of Patent: Sep. 2, 2008

(54) SPEED-VARIABLE MAXIMUM DELAY CLAMPING WHEN USING VARIABLE-DELAY RANDOM PWM SWITCHING

(75) Inventors: Steven E. Schulz, Torrance, CA (US); Daniel L. Kowalewski, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 580 days.

(21) Appl. No.: 10/933,682

(22) Filed: Sep. 3, 2004

(65) Prior Publication Data

US 2006/0050831 A1 Mar. 9, 2006

(51) Int. Cl.
G05B 11/28 (2006.01)
H02M 1/14 (2006.01)
H02M 5/275 (2006.01)
H02P 7/06 (2006.01)
G05B 15/00 (2006.01)

(52) U.S. Cl. .......................... 700/1; 318/599; 318/638; 318/811; 388/921; 388/804; 363/41; 363/163; 363/132

(58) Field of Classification Search .................. 700/1; 318/254, 293, 599, 638, 811, 138; 363/41, 363/163, 132; 128/204.18; 180/65.2; 388/921, 388/804
See application file for complete search history.

(56) References Cited

U.S. PATENT DOCUMENTS 4,628,910 A * 12/1986 Krukowski .................. 601/26
4,824,104 A * 4/1989 Bloch ............................ 482/6
5,196,778 A * 3/1993 Hayashida .................. 318/807
5,510,698 A * 4/1996 Stankovic et al. ........... 323/282
6,107,776 A * 8/2000 Nakazawa ................... 318/811
6,510,068 B1 * 1/2003 Bors ........................... 363/163
6,600,669 B2 * 7/2003 Trzynadlowski et al. ...... 363/41
6,674,962 B2 * 1/2004 Nadeau ....................... 388/804
6,933,691 B2 * 8/2005 Tarasinski et al. ........... 318/293
6,968,842 B1 * 11/2005 Truschel et al. ......... 128/204.18
6,972,534 B1 * 12/2005 Schulz et al. ................ 318/254
7,006,413 B2 * 2/2006 Takayama et al. ......... 369/47.36
2004/0069546 A1 * 4/2004 Lou et al. ................... 180/65.2

OTHER PUBLICATIONS

"V speeds", wikipedia, (http://en.wikipedia.org/wiki/V-speeds).*
"Speed", wikipedia, (http://en.wikipedia.org/wiki/Speed).*
Shin Kim et al., "Adjustable Speed Drive Control Based on Random Pulse Width Modulation", (http://www.ece.wisc.edu/~lipo/2000pub/C155.pdf), A&T State University.*
"V speeds", wikipedia, (http://en.wikipedia.org/wiki/V-speeds), 2007.*
"Speed", wikipedia, (http://en.wikipedia.org/wiki/speed), 2007.*

* cited by examiner

*Primary Examiner*—Albert DeCady
*Assistant Examiner*—Sunray R Chang

(57) ABSTRACT

A control system and a method of using the same for an electric machine having a random number generating module generating a random number ranging from a first value to a second value, a multiplying module multiplying the random number and a sample rate to generate an random delay value; and a delay limiter module limiting the random delay value as a function of speed of the electric machine and generating a limited delay value.

22 Claims, 2 Drawing Sheets

US 7,421,301 B2

SPEED-VARIABLE MAXIMUM DELAY CLAMPING WHEN USING VARIABLE-DELAY RANDOM PWM SWITCHING

FIELD OF THE INVENTION

The present invention relates to power converters and, more particularly, relates to a variable-delay random pulse width modulation control system having a maximum delay limit as a function of motor speed.

BACKGROUND OF THE INVENTION

Random pulse width modulation (RPWM) is recognized as a desirable technique to reduce both electromagnetic and acoustic noise emissions from pulse width modulation (PWM) inverters. RPWM is generally characterized by random variations of the switching frequency. The random variations of the frequency alleviate undesirable characteristics in PWM electronic power converters. Specifically, the fundamental AC component harmonics remain unchanged. However, the spectral power, measured in Watts, is converted to continuous power density, measured in Watts per Hertz, instead of being concentrated in discrete harmonics. The power spectra of the output voltage and current from a RPWM power converter emulate the spectrum of white noise. Consequently, spurious phenomena are significantly mitigated.

Additionally, conventional variable-delay random pulse width modulation (VD-RPWM) may also be used for various applications to further alleviate undesirable characteristics. In fact, the variable-delay random PWM technique provides a number of significant advantages over other RPWM techniques.

Known prior art systems have demonstrated the excellent EMC performance of true random switching frequency modulation techniques where both the sampling and PWM periods are synchronized. However, these RSF systems suffer from a significant disadvantage, namely the maximum code size is limited by the minimum sample period. Furthermore, the random sample rate places a constraint on the minimum sample period based upon the required time to execute the application code. For complicated motor control algorithms, the length of code may not allow sufficiently high switching frequency to achieve good spectral spreading.

Fixed sample rate techniques, on the other hand, allow optimal use of the processor computational capability. For example, random zero vector, random center displacement, and random lead-lag techniques all maintain synchronous sample and PWM period, but suffer some form of limitation. For example, random zero vector and random center displacement lose effectiveness at high modulation indexes. Random lead-lag does not offer suitable performance with respect to reducing acoustic/EMI emissions and, further, suffers an increased current ripple. Additionally, both random lead-lag and random center displacement introduce an error in the fundamental component of current due to a per-cycle average value of the switching ripple.

The VD-RPWM technique allows a fixed sample rate for optimal usage of processor computational power, while providing quasi-random PWM output for good spectral spreading. However, conventional VD-RPWM suffers from disadvantages when operated at high fundamental frequencies. For example, using a 4-pole induction machine with a maximum speed of 14 krpm, the highest fundamental electrical frequency is 467 Hz. In this situation, using a 12 kHz sample rate, conventional VD-RPWM techniques provide satisfactory control. On the other hand, when used with induction machines having eight or more poles, the highest fundamental electrical frequency may exceed 800 Hz. In these cases, the delay introduced by VD-RPWM may cause undesirable instability.

SUMMARY OF THE INVENTION

According to the principles of the present invention, a control system for an electric machine is provided having an advantageous construction and advantageous method of use. The control system includes a random number generating module generating a random number ranging from a first value to a second value. A multiplying module multiplies the random number and a sample rate to generate an random delay value. A delay limiter module limits the random delay value as a function of speed of the electric machine and generates a limited delay value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses. As used herein, the term "module" refers to an application specific integrated circuit (ASIC), an electronic circuit, a processor (shared, dedicated, or group) and memory that execute one or more software or firmware programs, a combinational logic circuit, and/or other suitable components that provide the described functionality.

As discussed above, conventional variable-delay random pulse width modulation (VD-RPWM) provides a number of significant advantages over other RPWM techniques. According to conventional VD-RPWM, the sample rate (input), $T_s$, remains constant while the PWM output period, $T_{sw}$, is randomly varied from $T_{sw\_min}$ to $2*T_s$, where $T_{sw\_min}$ is the minimum PWM switching period to be allowed and $T_s$ is the sample rate. This wide range in PWM output period provides excellent spectral spreading in many cases for improved modulation.

Figure 3:
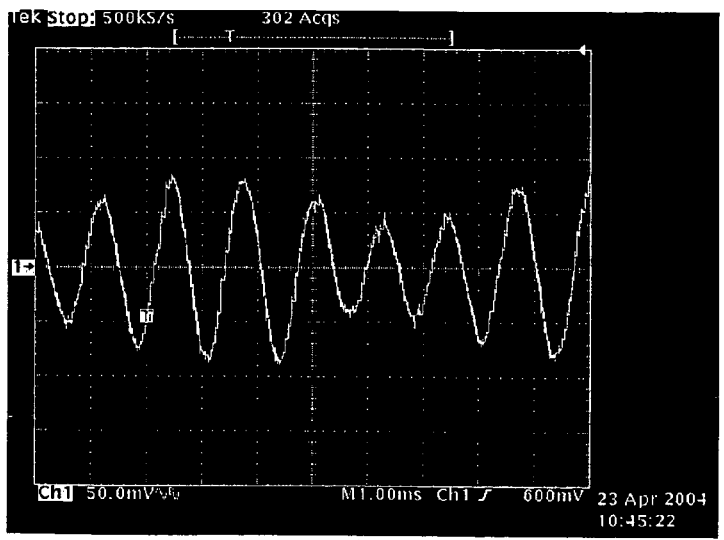
FIG. 3 is a phase current waveform according to the prior art having $f_{samp}$ equal to 11.1 kHz, $f_e$ equal to 800 Hz, and $I_q$ equal to 60 A.

However, in applications having high fundamental electrical frequency and limited sample rate (for example, fundamental electrical frequencies above about 500 Hz with 12 kHz sample rates), conventional VD-RPWM techniques may exhibit significant control problems. In other words, in these cases, the additional delay introduced by conventional VD-RPWM becomes more critical and can cause instability. This instability can be seen in FIG. 3, which illustrates a phase current waveform according to the prior art having $f_{samp}$ equal to 11.1 kHz, $f_e$ equal to 800 Hz, and $I_q$ equal to 60 A. As can be seen, the resultant waveform exhibits instability as evidenced by the varying amplitude between cycles. This condition is undesirable in current regulator systems.

It is undesirable to vary the sample rate (input) $T_s$ since maintaining a constant sample rate offers many advantages. For example, many of the coefficients used in digital controllers are sample time dependent. By maintaining fixed sample rates, the need to recalculate coefficients every time the PWM period is changed is eliminated. Additionally, by maintain fixed sample rates, the time required for software execution remains fixed. This permits predictable and optimized usage of the microprocessor's capability and capacity. In other techniques that have variable sample rates, the maximum code length is limited by the minimum sample period. This may be a significant drawback in many applications.

Therefore, according to some embodiments of the present invention, a control system or algorithm is used to "clamp" or otherwise limit the maximum delay of the system to alleviate such control instability. More particularly, this clamping function is introduced as a function of motor speed. The algorithm introduces a random delay into the trailing edge of the next PWM output cycle. Therefore, because two consecutive edges determine the PWM output period, a quasi-random PWM output is created.

Figure 1:
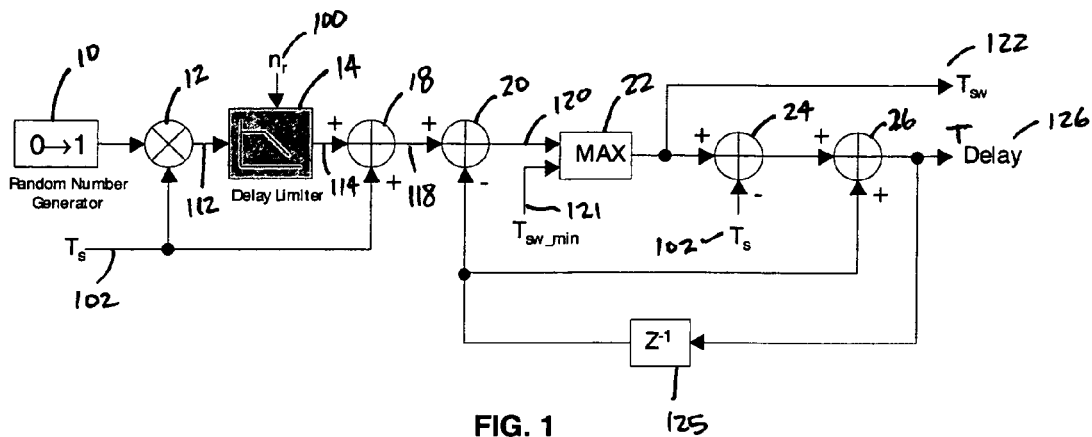
FIG. 1 is a block diagram illustrating the implementation of the speed-variable maximum delay clamping according to some embodiments of the present invention.

With reference to FIG. 1, a block diagram is shown illustrating the computation of the variable delay and the integration according to some embodiments of the present invention. With continued reference to FIG. 1, a random floating point number between first and second values is first generated in a random number generator 10. In some embodiments, this random number is then multiplied with a sample time $T_s$ at multiplier 12 and results in an initial random delay value 112. This initial random delay value 112 is then introduced into a delay limiter 14. Delay limiter 14 limits the initial random delay value 112 in response to motor speed, $n_r$ (see reference numeral 100).

Figure 2:
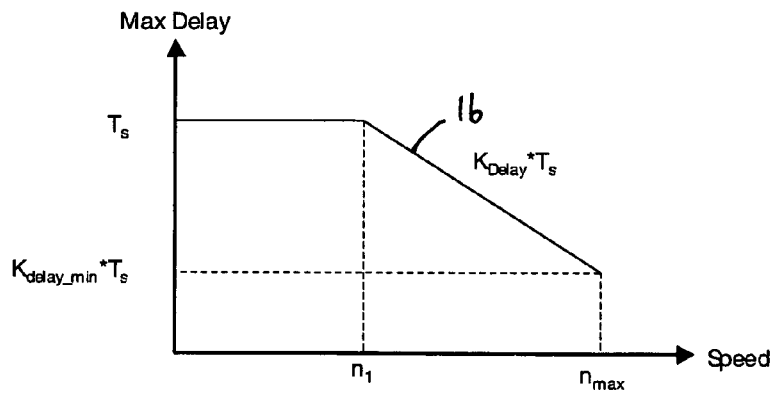
FIG. 2 is a graph illustrating the speed-variable scheduling of the maximum delay.

As best seen in FIG. 2, a graph illustrates the speed-variable scheduling of the maximum delay, generally referred to as limit curve 16. More particularly, it can be seen that for a machine speed between 0 and $n_1$, the maximum allowable delay is equal to $T_s$, which is the sample period (see reference numeral 102). However, for machine speeds between $n_1$ and $n_{max}$, it can be seen that the maximum allowable delay is reduced from $T_s$ to $T_s*K_{delay\_min}$, where $K_{delay\_min}$ is a configurable constant set by the user and $n_1$ is similarly determined by the user. It should be noted, however, that $n_1$ may represent a motor speed where instability is recognized in the system. Therefore, as can be seen from FIG. 2, delay limiter 14 is operable to limit the initial random delay value to an area on or below limit curve 16. According to the present invention, maximum variability of the PWM period is available at low motor speeds, while controllability of the phase current is maintained at high speeds, thereby resulting in improved stability. It should be noted, however, that limit curve 16 may have any one of a number of defined shapes. By way of non-limiting example, limit curve 16 could be exponential, parabolic, or the like.

Referring again to FIG. 1, an output or limited delay value 114 of delay limiter 14 is then added to $T_s$ at summer 18 and is output as a intermediate calculation 118. At subtractor 20, the intermediate calculation from the previous cycle, $T_{delay}*z^{-1}$ 125 is subtracted to define a calculated switching period $T_{sw\_before\_check}$ 120. $T_{sw\_before\_check}$ 120 is then compared with $T_{sw\_min}$ 121 at comparator 22. If $T_{sw\_before\_check}$ 120 is greater than $T_{sw\_min}$ 121, then $T_{sw\_before\_check}$ 120 is unchanged and is output as $T_{sw}$ 122. If $T_{sw\_before\_check}$ 120 is less than $T_{sw\_min}$ 121, then $T_{sw\_before\_check}$ 120 is changed to equal $T_{sw\_min}$ 121 and output as $T_{sw}$ 122. Comparator 22 serves to prevent very short output PWM periods from being commanded. Finally, $T_s$ 102 is subtracted from $T_{sw}$ 122 at subtractor 24. The delay of the previous cycle, $T_{delay}*z^{-1}$ 125, is then added to the result of subtractor 24 at summer 26 to define the delay of the current cycle, $T_{delay}*z^0$ 126. Therefore, in other words, the switching time, $T_{sw}$, can be expressed as follows:

$$T_{sw} = T_s + T_{delay}*z^0 - T_{delay}*z^{-1}$$

where $z^0$ is the current cycle and $z^{-1}$ is the previous cycle. Using this technique, the resultant switching period, $T_{sw}$ 122, may vary from $T_{sw\_min}$ 121 to $T_s*(1+K_{delay})$. The average switching period will equal the sample period $T_s$ over time.

Figure 4:
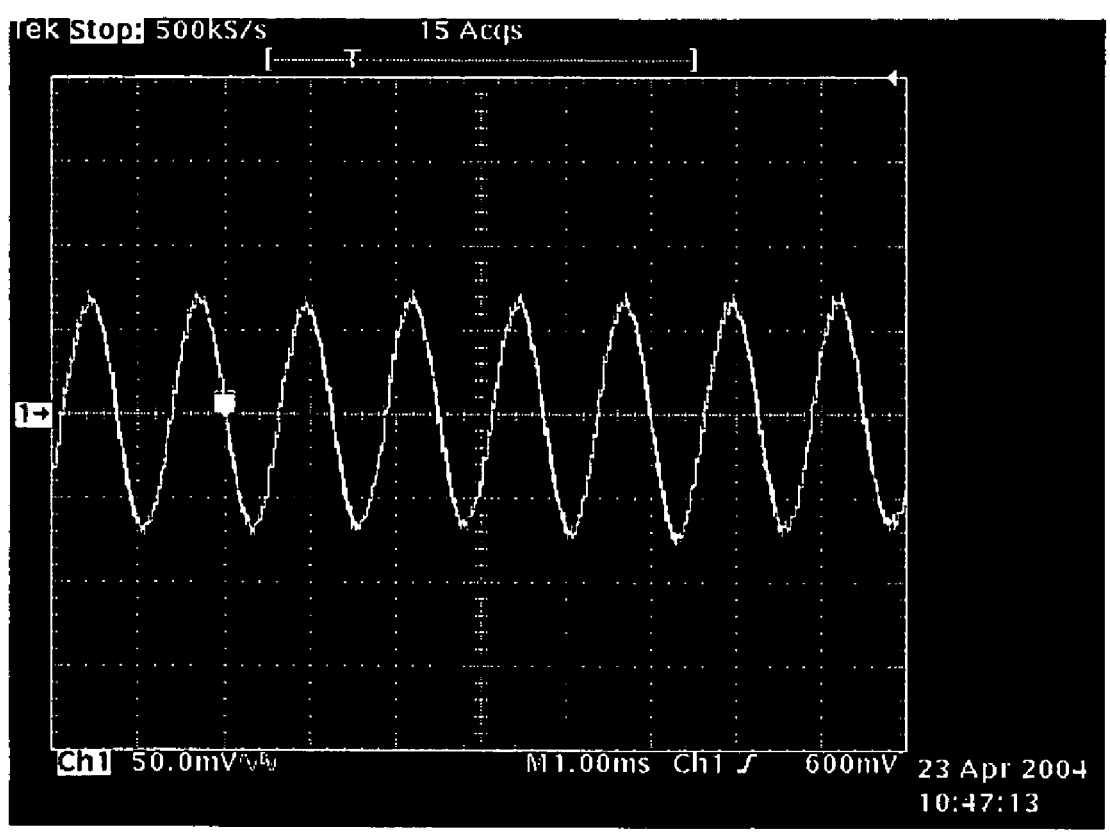
FIG. 4 is a phase current waveform according to some embodiments of the present invention having $f_{samp}$ equal to 11.1 kHz, $f_e$ equal to 800 Hz, $I_q$ equal to 60 A, and $K_{delay}$ of 0.5.

To demonstrate the effectiveness of some embodiments of the present invention, laboratory tests were conducted utilizing a 600V/600A power inverter with floating point processor and an inductive load. VD-RPWM according to the present invention was implemented in the module. By way of comparison, as described above, FIG. 3 illustrates the resultant phase current when no clamping with a sample rate of 11.1 kHz, and controlling a fundamental frequency of 800 Hz. As can be seen, the current is oscillatory. FIG. 4 shows the current under the same conditions when the present invention is implemented. As can be seen, the current is now well behaved and the oscillations are gone.

The present invention provides a number of advantages over the prior art. By way of non-limiting example, the present invention provides a method of maintaining control stability of high speed motors. Additionally, by facilitating RPWM operation at high speed, EMI emissions are reduced, thereby requiring smaller filtering requirements. Smaller filtering requirement consequently lead to reduced overall size, reduced cost, and lower weight. Still further, the present invention leads to reduced acoustic noise. This is particularly important when lower switching frequency is used in that it results in lower switching losses in the inverter when operating at low speeds.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an electric machine, comprising:
   a random number generating module that generates a random number ranging from a first value to a second value;
   a multiplying module that multiplies said random number and a sample rate to generate a random delay value; and
   a delay limiter module that limits said random delay value as a function of speed of said electric machine and generates a limited delay value, wherein a pulse width modulated drive signal is generated for said electric machine based on said limited delay value.

2. The control system according to claim 1 further comprising:
a switch module that receives said limited delay value from said delay limiter module, that adds said sample rate, that subtracts a delay period of a previous cycle, and that outputs a calculated switching period.

3. The control system according to claim 2 further comprising:
a max checking module that compares said calculated switching period to a predetermined minimum switching period, that outputs a final switching period that is equal to said calculated switching period if said calculated switching period is greater than said minimum switching period and that is equal to said minimum switching period if said calculated switching period is less than said minimum switching period.

4. The control system according to claim 3 further comprising: a delay calculating module that receives said final switching period from said max checking module, that subtracts said sample rate, that adds said delay period of said previous cycle and that outputs a delay period for a current cycle.

5. The control system according to claim 1 wherein said delay limiter module further limits said random delay value as a function of speed for speeds greater than a predetermined value.

6. The control system according to claim 5 wherein said delay limiter module limits said random delay value in an inversely proportional manner relative to said speed of said electric machine for speeds greater than said predetermined value.

7. The control system according to claim 1 wherein said first value is 0 and said second value is 1.

8. A control system for an electric machine, said control system comprising:
a random number generating module that generates a random number ranging from a first value to a second value;
a multiplying module that multiplies said random number and a sample rate to generate a random delay value; and
a delay limiter module that limits said random delay value as a function of speed of said electric machine and generates a limited delay value, that limits said random delay value as a function of speed for speeds great than a predetermined value, which is greater than a minimum speed of said electric machine and less than a maximum speed of said electric machine, wherein a pulse width modulated drive signal is generated for said electric machine based on said limited delay value.

9. The control system according to claim 8 further comprising:
a switch module that receives said limited delay value from said delay limiter module, that adds said sample rate and subtracts a delay period of a previous cycle, and that outputs a calculated switching period.

10. The control system according to claim 9 further comprising: a max checking module that compares said calculated switching period to a predetermine minimum switching period, that outputs a final switching period that is equal to said calculated switching period if said calculate switching period is greater than said minimum switching period and that is equal to said minimum switching period if said calculated switching period is less than said minimum switching period.

11. The control system according to claim 10 further comprising: a delay calculating module that receives said final switching period from said max checking module, that subtracts said sample rate and adds said delay period of said previous cycle, and that outputs a delay period for a current cycle.

12. The control system according to claim 8 wherein said delay limiter module limits said random delay value in an inversely proportional manner relative to said speed of said electric machine for speeds greater than said predetermined value.

13. The control system according to claim 8 wherein said first value is 0 and said second value is 1.

14. A control method comprising:
generating a random number ranging from a first value to a second value;
multiplying said random number and a sample rate to generate a random delay value;
limiting said random delay value as a function of speed of electric machine;
generating a limited delay value; and
generating a pulse width modulated drive signal for said electric machine based on said limited delay value.

15. The control method according to claim 14 further comprising:
receiving said limited delay value;
adding said sample rate to said limit delay value; and
subtracting a delay period of a previous cycle from said limit delay value to output a calculated switching period.

16. The control method according to claim 15 further comprising:
comparing said calculated switching period to a predetermine minimum switching period; and
outputting a final switching period that is equal to said calculated switching period if said calculated switching period is greater than said minimum switching period and that is equal to said minimum switching period if said calculated switching period is lesser than said minimum switching period.

17. The control method according to claim 16 further comprising:
receiving said final switching period;
subtracting said sample rate; and
adding said delay period of said previous cycle to output a delay period for a current cycle.

18. The control method according to claim 14 wherein said limiting said random delay value as a function of speed of said electric machine and generating a limited delay value includes limiting said random delay value as a function of speed for speeds greater than a predetermined value.

19. The control method according to claim 18 wherein said limiting said random delay value is inversely proportionally to said speed of said electric machine for speeds greater than said predetermined value.

20. The control system according to claim 1 wherein said function of speed of said electric machine establishes an upper limit for said random delay value.

21. The control system according to claim 8 wherein said function of speed of said electric machine establishes an upper limit for said random delay value.

22. The control method according to claim 14 wherein said function of speed of said electric machine establishes an upper limit for said random delay value.

* * * * *